United States Patent
Murai

(10) Patent No.: US 8,770,916 B1
(45) Date of Patent: Jul. 8, 2014

(54) HYDROELECTRIC POWER GENERATION SYSTEM

(71) Applicant: Kiyotoshi Murai, Kanazawa (JP)

(72) Inventor: Kiyotoshi Murai, Kanazawa (JP)

(73) Assignee: Kiyotoshi Murai, Ishikawa (JP)

( * ) Notice: Subject to any disclaimer, the term of this patent is extended or adjusted under 35 U.S.C. 154(b) by 0 days.

(21) Appl. No.: 13/825,285

(22) PCT Filed: Jan. 18, 2013

(86) PCT No.: PCT/JP2013/050891
§ 371 (c)(1),
(2), (4) Date: Nov. 13, 2013

(30) Foreign Application Priority Data

Dec. 31, 2012 (JP) ................................. 2012-289278

(51) Int. Cl.
F03B 1/04 (2006.01)

(52) U.S. Cl.
USPC .................. 415/3.1; 415/4.1; 415/80; 415/81

(58) Field of Classification Search
USPC ............ 415/3.1, 4.1, 7, 80, 81; 416/20 R, 84, 416/198 R, 201 R
See application file for complete search history.

(56) References Cited

FOREIGN PATENT DOCUMENTS

| GB | 403584 A | 12/1933 |
|---|---|---|
| GB | 2128259 A | 4/1984 |
| JP | H11-159433 A | 6/1999 |

*Primary Examiner* — Edward Look
*Assistant Examiner* — Aaron R Eastman
(74) *Attorney, Agent, or Firm* — Law Office of Katsuhiro Arai

(57) ABSTRACT

Provide a hydroelectric power generation system that can increase generation efficiency by keeping the rotational resistance of the runner low, while preventing water contamination at the same time.
The hydroelectric power generation system has: a first water storage tank 20 with a high-pressure water injection port 21 on the bottom face; a runner 40 which is stored in a condition of floating in the first water storage tank; and multiple transmission members 50 that contact the outer periphery surface of the runner and transmit the rotational force of the runner to the principal axis of rotation 61 in the generator unit 60. The runner has: a casing 41 of a cylindrical shape with a bottom, and having an opening 41b at the center of the bottom face; an introduction pipe 42 that rises upward from the opening to introduce into the casing high-pressure water injected from the injection port; first guide pipes 43 that extend radially from around the introduction pipe to the inner side face of the casing; and first injection nozzles 44 provided at the tips of the first guide pipes; wherein the reactive force of the high-pressure water injected from the first injection nozzles is utilized to turn the runner. Use of no bearing eliminates the problem of lower rotational efficiency of the runner due to generation of frictional resistance at the bearing, and the problem of lubricating oil leaking out of the system.

9 Claims, 5 Drawing Sheets

HYDROELECTRIC POWER GENERATION SYSTEM

This application is the U.S. National Phase under 35 U.S.C. §371 of International Application PCT/JP2013/50891, which claims priority to Japanese Patent Application No. 2012-289278, filed Dec. 31, 2012. The International Application was published under PCT Article 21(2) in a language other than English.

TECHNICAL FIELD

The present invention relates to a hydroelectric power generation system that can increase the generation efficiency by keeping the rotational resistance of the runner low, while preventing water contamination at the same time.

BACKGROUND ART

In response to the growing awareness of environmental conservation, we are seeing active development of power generation technologies that utilize hydraulic power, wind power, sunlight and other natural sources of energy as petroleum alternative energies in recent years. Among others, hydroelectric power generation is superior in that it can provide stable power with high efficiency.

Hydroelectric power generation methods include the impulse type and reaction type.

The Pelton type and Turgo impulse type, among others, are known types of impulse-type hydroelectric power generation, where, in both cases, water is caused to hit the blade of a runner to turn the runner to generate power.

Known types of reaction-type hydroelectric power generation include the Francis type and propeller type, where, in both case, the difference between the water pressures before and after the runner is utilized to turn the runner to generate power.

For example, Patent Literature 1 discloses a Francis-type power generation system that turns the runner with water pressure and transmits the resulting rotational power to the generator via the rotational shaft to generate power.

BACKGROUND ART LITERATURE

Patent Literature

Patent Literature 1: Japanese Patent Laid-open No. Hei 11-159433

SUMMARY OF THE INVENTION

Problems to be Solved by the Invention

However, the aforementioned prior art presents the problems described below.

To be specific, the structure is such that, whether the impulse type or reaction type is used, the rotational force of the runner is transmitted to the generator via the rotational shaft that runs through the center of the runner.

Generally the rotational shaft is retained by a bearing at, among its two ends, the one end not connected to the runner, to suppress runout caused by rotation.

This presents the problem of lower rotational efficiency of the runner due to frictional resistance at the bearing, and the problem of lubricating oil, used for the purpose of preventing wear and seizing of the bearing, leaking out of the system and contaminating water.

In light of the aforementioned problems, the object of the present invention is to provide a hydroelectric power generation system that can increase generation efficiency by keeping the rotational resistance of the runner low, while preventing water contamination at the same time.

Means for Solving the Problems

The hydroelectric power generation system proposed by the present invention has: a first water storage tank with a high-pressure water injection port on the bottom face; a runner which is stored in a condition of floating in the first water storage tank; and multiple transmission members that contact the outer periphery surface of the runner and transmit the rotational force of the runner to the principal axis of rotation in the generator unit; wherein such hydroelectric power generation system is characterized in that the runner has: a casing of a cylindrical shape with a bottom, and having an opening at the center of the bottom face; an introduction pipe that rises upward from the opening to introduce into the casing high-pressure water injected from the injection port; multiple first guide pipes that extend radially from around the introduction pipe to the inner side face of the casing; and first injection nozzles provided at the tips of the first guide pipes; wherein the reactive force of the high-pressure water injected from the first injection nozzles in the circumferential direction of the casing is utilized to turn the runner.

Such hydroelectric power generation system is also characterized in that reverse injection nozzles are provided on the inner face of the first water storage tank, which inject water in the direction opposite to the injection direction of the high-pressure water from the first injection nozzles.

Such hydroelectric power generation system is also characterized in that the runner has: an outer introduction pipe whose diameter is larger than that of the aforementioned introduction pipe and which rises upward from the opening with the aforementioned introduction pipe inserted inside; multiple second guide pipes that extend from around the outer introduction pipe radially to the inner side face of the casing; and second injection nozzles provided at the tips of the second guide pipes; wherein each first injection nozzle and each second injection nozzle are integrated near the inner side face of the casing.

Such hydroelectric power generation system is also characterized in that a screw is provided below the outer introduction pipe and this screw rotates together with the runner to take water out of the first water storage tank into the outer introduction pipe.

Such hydroelectric power generation system is also characterized in that it has at least one of a first connection pipe that interconnects the multiple first guide pipes and a second connection pipe that interconnects the multiple second guide pipes.

Such hydroelectric power generation system is also characterized in that the first guide pipes, first injection nozzles, second guide pipes and second injection nozzles are arranged in such a way that they do not overlap vertically in a plan view.

Such hydroelectric power generation system is also characterized in that at least one of the first guide pipes and second guide pipes is made smaller in cross-section area toward the outer side in the radial direction.

Such hydroelectric power generation system is also characterized in that at least one of the inner side face and bottom face of the first water storage tank has surface irregularities.

Such hydroelectric power generation system is also characterized in that it has a second water storage tank at a position where the level of water therein becomes higher than the level of water in the first water storage tank, so that the water level difference between the first water storage tank and second water storage tank is utilized to generate high-pressure water.

Effects of the Invention

Unlike conventional systems, the hydroelectric power generation system proposed by the present invention does not use any bearing to retain the center shaft of the runner. The runner turns by receiving the reactive force of the high-pressure water injected from the first injection nozzles, while floating in the first water storage tank. This eliminates the problem of lower rotational efficiency of the runner due to frictional resistance at the bearing, or the problem of lubricating oil, used for the bearing, leaking out of the system. In other words, compared to any conventional hydroelectric power generation system, the generation efficiency can be increased by keeping the rotational resistance of the runner low, while preventing water contamination at the same time.

In addition, because the runner is supported only by the multiple transmission members contacting its outer periphery surface, tilting of the runner while floating in the first water storage tank can be suppressed, which in turn prevents runout of the turning runner.

Furthermore, the structure is such that each of the multiple transmission members arranged around the runner transmits the rotational force of the runner to the principal axis of rotation in the generator unit, which allows for installation of multiple generator units for one runner to increase the generation capacity.

Additionally, turning of water inside the first water storage tank can be suppressed by injecting water from the reverse injection nozzles in the direction opposite the injection direction of the high-pressure water from the first injection nozzles.

Moreover, by providing the second injection nozzles which are integrated with the first injection nozzles near the inner side face of the casing, the amount (weight) of water injected onto the exterior of the runner can be increased compared to when high-pressure water is injected only from the first injection nozzles, and this in turn increases the reactive force received by the runner and consequently increases the rotational force (moment of force) of the runner.

Furthermore, the screw provided below the outer introduction pipe allows a larger amount of water to be supplied to the second injection nozzles, thereby increasing the amount of water injected onto the exterior of the runner.

Additionally, by using the first connection pipe, the water pressure of the high-pressure water traveling through the first connection pipe can be injected from each first injection nozzle after being equalized in the first connection pipe. This way, the reactive force of each first injection nozzle, which acts upon the runner, is equalized to suppress runout of the turning runner. Also, since the heavy first connection pipe is arranged at a position away from the center of rotation of the runner in the diameter direction, runout of the turning runner is further suppressed. This effect is also achieved when the second connection pipe is used.

Moreover, by arranging the first guide pipes, first injection nozzles, second guide pipes and second injection nozzles in such a way that they do not overlap vertically in a plan view, the weight balance of the runner can be equalized to suppress runout of the turning runner.

Also, by making the first guide pipes smaller in cross-section area toward the outer side in the radial direction, water near the second injection nozzles is suctioned toward the first injection nozzles due to the venturi effect. This increases the amount (weight) of water to be injected onto the exterior of the runner and thereby increases the rotational force of the runner.

In addition, turning of water inside the first water storage tank can be suppressed by providing surface irregularities on the first water storage tank.

Additionally, by providing the second water storage tank and utilizing its water level difference from the first water storage tank to generate high-pressure water, there is no longer a need to pay for electricity compared to when, for example, a compressor or other electrical drive unit is used to generate high-pressure water, and at the same time the system structure can be simplified and manufacturing cost and running cost reduced, as well.

MODE FOR CARRYING OUT THE INVENTION

Figure 1:
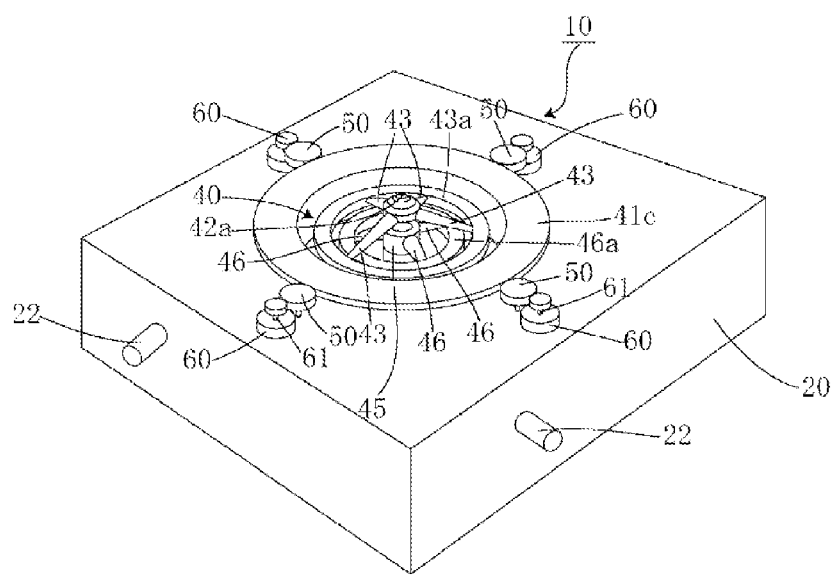
FIG. 1 is a drawing showing perspective view of key parts, showing the first water storage tank, runner, transmission members and generator unit

The mode for carrying out the hydroelectric power generation system proposed by the present invention is explained below by referring to the drawings.

Figure 2:
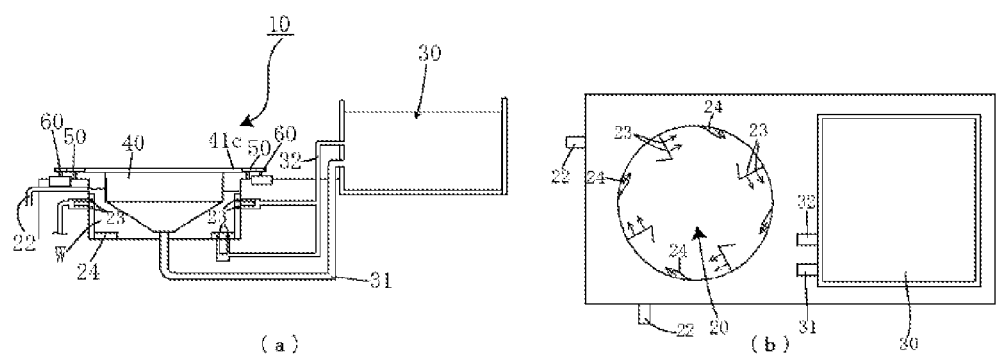
FIG. 2 is a drawing showing longitudinal section view of the hydroelectric power generation system (a) and plan view of the hydroelectric power generation system without a runner (b).

As shown in FIGS. 1 and 2, a hydroelectric power generation system 10 roughly comprises a first water storage tank 20, a second water storage tank 30, a runner 40, transmission members 50, a generator unit 60, etc.

Figure 3:
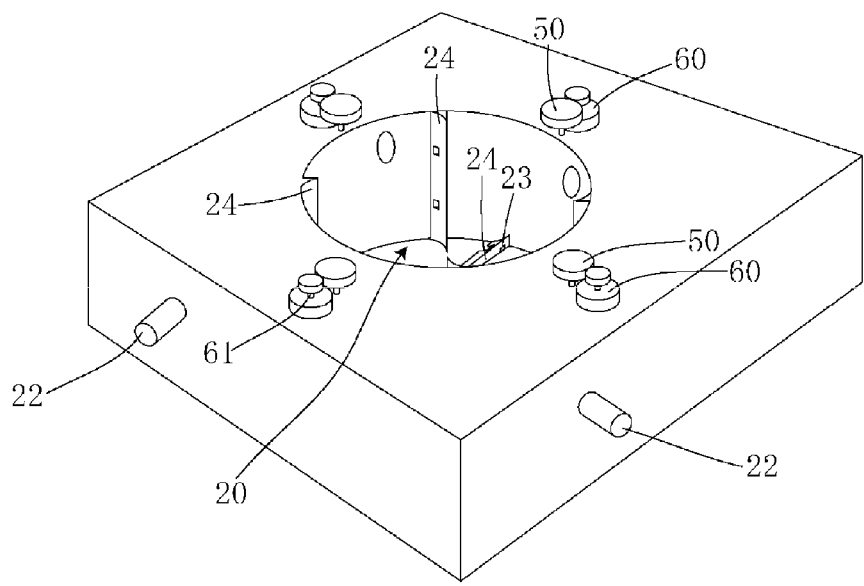
FIG. 3 is a drawing showing perspective view of key parts, showing the hydroelectric power generation system without a runner.
Figure 4:
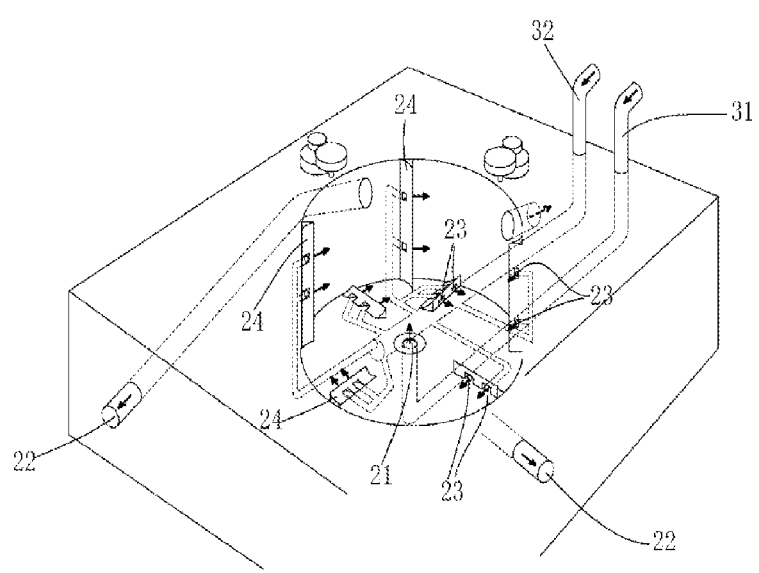
FIG. 4 is a drawing showing perspective view of key parts, showing the layout of pipelines, etc., without a runner.

As shown in FIGS. 3 and 4, the first water storage tank 20 has a cylindrical shape with a bottom, and is provided to store water W inside.

The first water storage tank 20 has an injection port 21 at the center of its bottom face so that the high-pressure water sent from the second water storage tank 30 flows out upward from the injection port 21. By discharging water from the first water storage tank 20 via a discharge port 22 as deemed appropriate, the level of water is kept constant.

In addition, reverse injection nozzles 23 are provided on the inner side face and bottom face of the first water storage tank 20, to inject water in the direction opposite to the injection direction of the high-pressure water from first injection nozzles 44 as described later. Also, the inner side face and bottom face of the first water storage tank 20 has surface irregularities 24. The operations and effects of the reverse injection nozzles 23 and surface irregularities 24 are described later.

Figure 5:
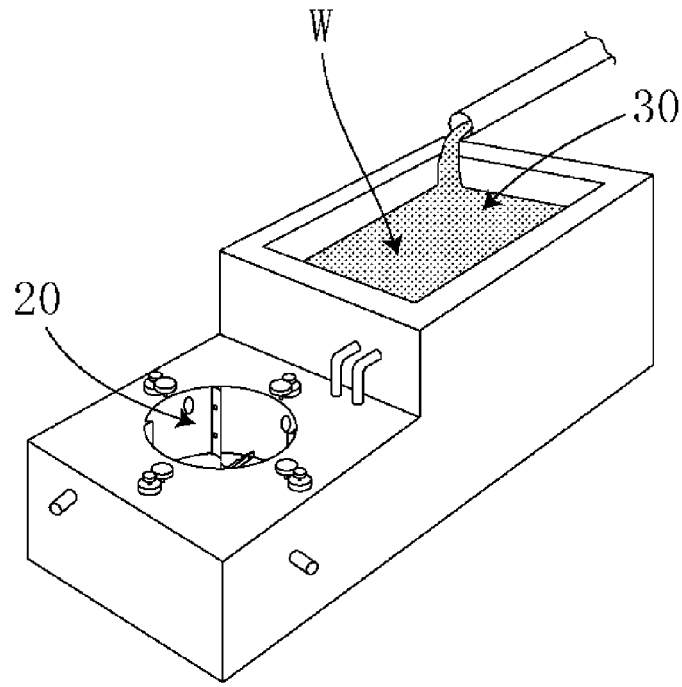
FIG. 5 is a drawing showing general perspective view of the hydroelectric power generation system without a runner.

As shown in FIGS. 2 and 5, the second water storage tank 30 is arranged at a position where the level of water therein becomes higher than the level of water in the first water storage tank 20. The injection port 21 of the first water storage tank 20 is connected to the second water storage tank 30 via a pipeline 31, so that the high-pressure water generated by utilizing the water level difference between the first water storage tank 20 and second water storage tank 30 is sent to the injection port 21 via the pipeline 31.

Figure 6:
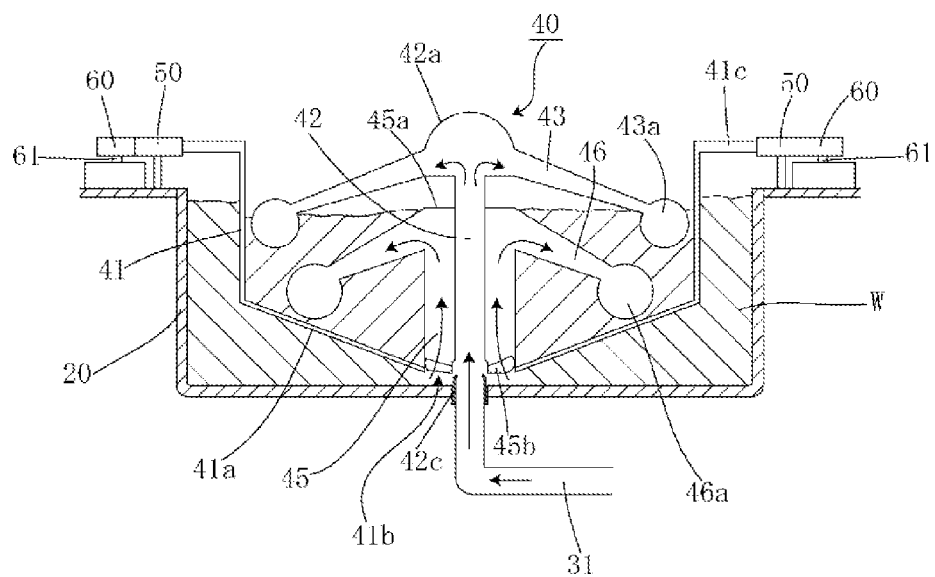
FIG. 6 is a drawing showing longitudinal section view of the runner.
Figure 7:
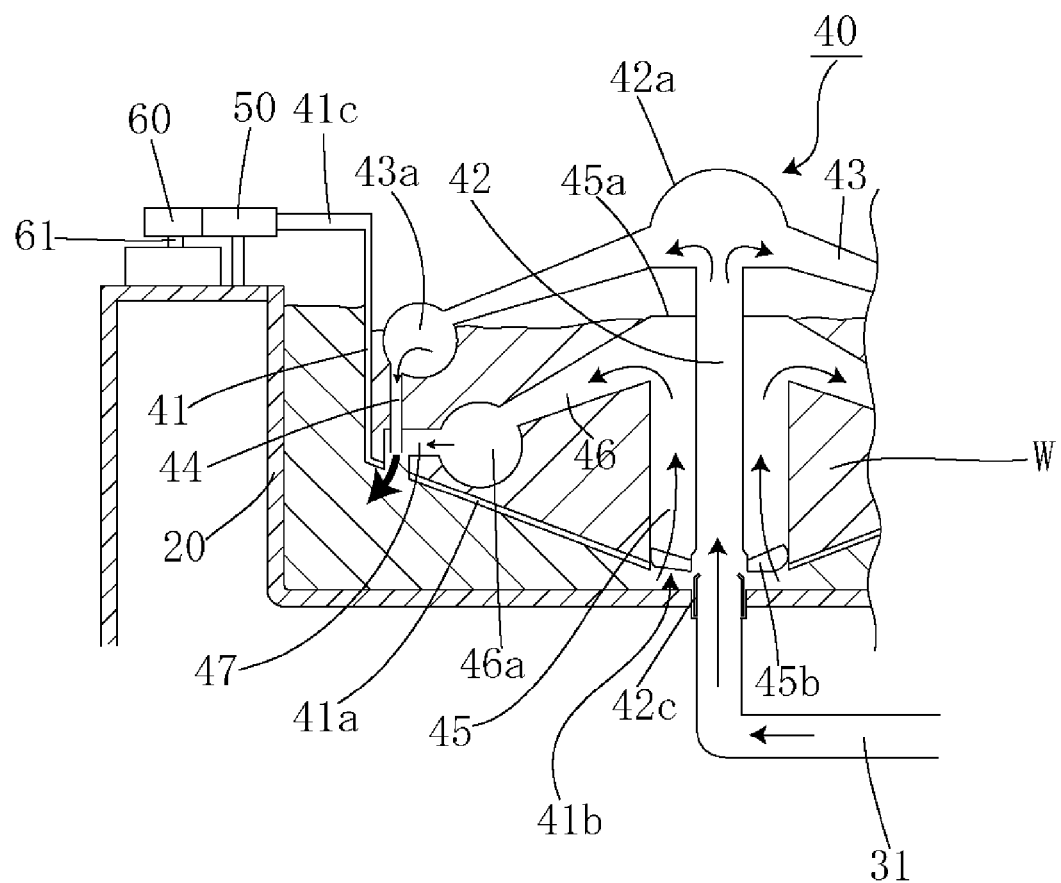
FIG. 7 is a drawing showing longitudinal section view of key parts of the runner, showing the location where the first injection nozzle and second injection nozzle are integrated near the inner side face of the casing
Figure 8:
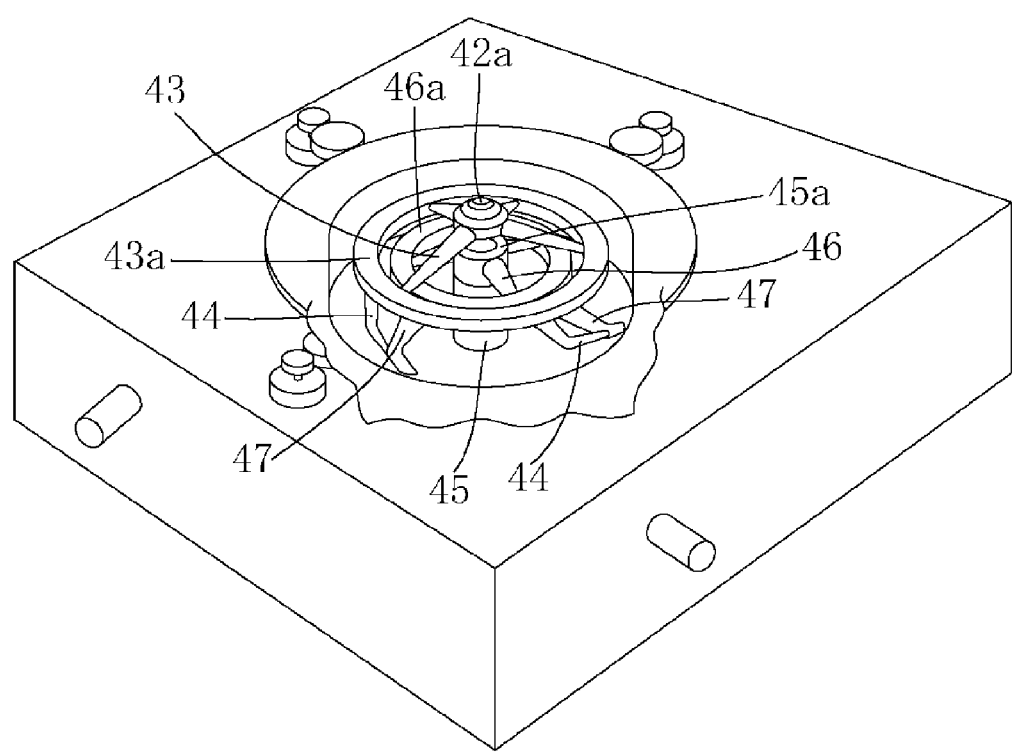
FIG. 8 is a drawing showing perspective view of key parts of the hydroelectric power generation system with a runner.

As shown in FIGS. 6 to 8, the runner 40 is stored while floating in the first water storage tank 20.

The runner 40 has a casing 41, introduction pipe 42, first guide pipes 43, and first injection nozzles 44 and, in this embodiment, it further has an outer introduction pipe 45, second guide pipes 46, and second injection nozzles 47.

The casing 41 has a cylindrical shape with a bottom whose diameter is smaller than that of the first water storage tank 20.

A bottom face 41a of the casing 41 is tapered so that the diameter of its cross-section on the horizontal plane becomes smaller at lower positions, with an opening 41b provided at the center of the bottom end. Because of this shape of the casing 41, the runner 40 can turn stably, like a top, while floating in the first water storage tank 20.

Provided at the top of the casing 41 is an edge 41c that projects toward the outside in the radial direction, and the multiple (four in this embodiment) transmission members 50 contacting the edge 41c keep the runner 40 from tilting while floating in the first water storage tank 20, thereby structurally preventing runout of the turning runner 40.

The introduction pipe 42 is a tubular member that rises upward from the opening 41b of the casing 41, and its top end is sealed with a lid 42a to ensure water tightness. The introduction pipe 42 is provided to introduce into the casing 41 the high-pressure water flowing out from the injection port 21, and send it to the first guide pipe 43 described next. Also, a tubular member 42c whose top is slightly smaller in diameter is provided at the injection port 21 so that as much high-pressure water flowing out from the injection port 21 as possible can be introduced into the introduction pipe 42.

A structure is acceptable where the tubular member 42c is fixed to the injection port 21, or it moves upward when the high-pressure water is flowing out from the injection port 21, by receiving the pressure from the high-pressure water, while moving downward when the high-pressure water is not flowing out from the injection port 21.

The first guide pipe 43 is a member that extends from around the top of the introduction pipe 42 to near the inner side face of the casing 41, and has the first injection nozzle 44 at its tip (refer to FIGS. 7 and 8). Multiple (four in this embodiment) first guide pipes 43 are arranged radially at an equal angle pitch in a circumferential direction (90-degree pitch in this embodiment) in a plan view. The first guide pipes 43 also incline downward toward the outer side in the diameter direction.

Saving a detailed explanation until later, the mechanism is such that the high-pressure water traveling through the introduction pipe 42 is injected into the first water storage tank 20 from the first injection nozzles 44 via the first guide pipes 43, to cause a reactive force to act upon the runner 40 and this reactive force is utilized to turn the runner 40.

The first guide pipes 43 are interconnected by a ring-shaped first connection pipe 43a, and the inside of the first connection pipe 43a is filled with the high-pressure water traveling through each first guide pipe 43.

By providing the first connection pipe 43a, the water pressure of the high-pressure water traveling through each first guide pipe 43 can be injected from each first injection nozzle 44 after being equalized in the first connection pipe 43a. This way, the reactive force of each first injection nozzle 44, which acts upon the runner 40, is equalized to suppress runout of the turning runner 40. Also, since the heavy first connection pipe 43a is arranged at a position away from the center of rotation of the runner 40 in the diameter direction, runout of the turning runner 40 is further suppressed.

The outer introduction pipe 45 is a tubular member whose diameter is larger than that of the introduction pipe 42, and rises upward from the opening 41b of the casing 41 with the introduction pipe 42 inserted inside. The top end of the outer introduction pipe 45 is sealed with a lid 45a to ensure water tightness.

The second guide pipe 46 is a member that extends from around the outer introduction pipe 45 to near the inner side face of the casing 41, and has the second injection nozzle 47 at its tip. Multiple (four in this embodiment) second injection nozzles 47 are arranged radially at an equal angle pitch in a circumferential direction (90-degree pitch in this embodiment) in a plan view. The second guide pipes 46 also incline downward toward the outer side in the diameter direction.

The second guide pipes 46 are interconnected by a ring-shaped second connection pipe 46a, and the inside of the second connection pipe 46a is filled with the water traveling through each second guide pipe 46.

By providing the second connection pipe 46a, as in the case of the aforementioned first connection pipe 43a, the water pressure of the water traveling through each second guide pipe 46 can be injected from each second injection nozzle 47 after being equalized in the second connection pipe 46a. This way, the reactive force of each second injection nozzle 47, which acts upon the runner 40, is equalized to suppress runout of the turning runner 40. Also, since the heavy second connection pipe 46a is arranged at a position away from the center of rotation of the runner 40 in the diameter direction, runout of the turning runner 40 is further suppressed.

As shown in FIG. 7, each first injection nozzle 44 and each second injection nozzle 47 are integrated near the inner side face of the casing 41.

As shown by the arrow, water in the first water storage tank 20 travels through the outer introduction pipe 45 from the opening 41b of the casing 41 and reaches the second guide pipe 46, where it receives the centrifugal force generated by the rotation of the second guide pipe 46 (rotation of the runner 40) and reaches the second injection nozzle 47.

Since the second injection nozzle 47 is integrated with the first injection nozzle 44 near the inner side face of the casing 41, the water injected from the second injection nozzle 47 is injected onto the exterior of the runner 40 together with the high-pressure water injected from the first injection nozzle 44.

Here, desirably the shape of the first guide pipe 43 is a conical trapezoid that tapers so that its cross-section area becomes smaller toward the outer side in the diameter direction. This is because when the cross-section shape is a circle, pressure loss can be suppressed that would otherwise generate as the high-pressure water passes through the first guide pipe 43. Also, by reducing the diameter in the direction of moving away from the center of rotation, the speed of high-pressure water increases near the first injection nozzle 44 due to the venturi effect, while the water pressure drops and therefore water near the second injection nozzle 47 is suctioned. As a result, the amount (weight) of water injected onto the exterior of the runner 40 can be increased, thereby increasing the reactive force acting upon the runner 40 and consequently increasing the rotational force of the runner 40.

Furthermore, desirably a screw 45b (refer to FIGS. 6 and 7) is provided below the outer introduction pipe 45. As this screw 45b rotates with the runner 40, water can be actively taken into the outer introduction pipe 45 from the first water storage tank 20 by utilizing the screw 45b, which in turn increases the amount of water injected from the second injection nozzle 47.

In addition, desirably the first guide pipes 43, first injection nozzles 44, second guide pipes 46, and second injection nozzles 47 are arranged in such a way that they do not overlap vertically in a plan view. This way, the weight balance of the runner 40 can be equalized to suppress runout of the turning runner 40.

As shown in FIGS. 6 and 7, water W is filled in the runner 40 to roughly a half its height or more, and this lowers the center of gravity of the runner 40 and allows the runner 40 to turn in a stable manner.

When the level of water in the runner 40 is compared against the level of water in the first water storage tank 20, it is desirable to adjust the level of water in the runner 40 lower. By lowering the level of water in the runner 40, the water pressure of the water W in the first water storage tank 20, which is exerted toward the interior of the runner 40, can be utilized to suppress runout of the turning runner 40.

Also, desirably the level of water in the runner 40 is adjusted to a position equal to the position of the lid 45a at the top end of the outer introduction pipe 45 or higher than the lid 45a. This way, the outer introduction pipe 45 is always filled with water to prevent air from entering. If air enters, the water injected from the second injection nozzle 47 may be aerated, causing the reactive force that acts upon the runner 40 to vary.

Next, the operation of the hydroelectric power generation system 10 proposed by the present invention is explained.

As the user opens a valve (not illustrated) to release the high-pressure water from the second water storage tank 30, the high-pressure water moves upward through the introduction pipe 42 from the injection port 21 and branches into each first guide pipe 43, as shown by the arrows.

Then, once the first connection pipe 43a is filled with the high-pressure water, the high-pressure water is injected from each first injection nozzle 44 provided at the tip of each first guide pipe 43 in the circumferential direction of the casing 41 (such as in the counterclockwise direction shown in FIG. 1).

The runner 40 receives the reactive force of the high-pressure water injected from the first injection nozzle 44 and starts turning in the direction opposite the injection direction of the high-water pressure (such as the clockwise direction shown in FIG. 1).

As the runner 40 turns, the screw 45b provided below the outer introduction pipe 45 also turns and water is pumped out of the first water storage tank 20 into the outer introduction pipe 45. This water moves upward through the outer introduction pipe 45 and branches into each second guide pipe 46.

Then, the second connection pipe 46a is filled with water, and then the water travels near each second injection nozzle 47 provided at the tip of each second guide pipe 46. Thereafter, the water near the second injection nozzle 47 is suctioned toward the first injection nozzle 44 due to the venturi effect as mentioned above and injected onto the exterior of the runner 40 together with the high-pressure water from the first injection nozzle 44, and consequently the rotational force of the runner 40 increases gradually.

The reverse injection nozzles 23 provided on the inner side face and bottom face of the first water storage tank 20 inject water in the direction opposite the injection direction of the high-pressure water from the first injection nozzle 44 (such as the clockwise direction shown in FIG. 1). This is to prevent the problem of the runner 40 not turning as a result of the water in the first water storage tank 20 turning in the same direction as the injection direction of the high-pressure water (such as the counterclockwise direction shown in FIG. 1) upon receiving the pressure of the high-pressure water injected from the first injection nozzle 44. In other words, by injecting water from the reverse injection nozzles 23 in the direction opposite the injection direction of the high-pressure water, the movement of water to turn in the same direction as the injection direction of the high-pressure water from the first injection nozzle 44 can be stopped to ensure turning of the runner 40 itself without fail. Water supply to the reverse injection nozzles 23 can be achieved by connecting the second water storage tank 30 and reverse injection nozzles 23 via a pipeline 32.

Similarly, by providing the surface irregularities 24 on the inner side face and bottom face of the first water storage tank 20, turning of water inside the first water storage tank 20 is prevented as these surface irregularities 24 function as barrier walls.

The edge 41c at the top of the runner 40 is contacted by the multiple transmission members 50 that are shaft-supported in a manner rotatable on the horizontal plane. The mechanism is such that, as the runner 40 turns, each transmission member 50 also turns and the rotation of each transmission member 50 is transmitted to a principal axis of rotation 61 in the generator unit 60 to generate power.

As mentioned above, the hydroelectric power generation system 10 proposed by the present invention does not use any bearing to retain the center shaft of the runner 40 and the runner 40 turns while floating in the first water storage tank 20, and this prevents the problem of lower rotational efficiency of the runner 40 due to frictional resistance at the bearing, or the problem of lubricating oil, used for the purpose of preventing wear and seizure of the bearing, leaking out of the system. Accordingly, the rotational resistance of the runner 40 can be suppressed and generation efficiency improved compared to any conventional hydroelectric power generation system, while water contamination is also prevented at the same time.

Although the reverse injection nozzles 23 are provided in the above embodiment, it is also possible to suppress turning of water inside the first water storage tank 20 by only providing the surface irregularities 24 on at least one of the inner side face and bottom face of the first water storage tank 20 without providing the reverse injection nozzles 23. Additionally, these reverse injection nozzles 23 and surface irregularities 24 may not be necessary depending on the dimensions, shape and weight of the runner 40, water pressure (water impetus) of the high-pressure water injected from the first injection nozzle 44, and shape of the first water storage tank 20, among others. For example, turning of water inside the first water storage tank 20 may be prevented by making the first water storage tank 20 a cube and causing the water injected from the first injection nozzle 44 to hit the inner face of the first water storage tank 20 roughly vertically.

In addition, there are no mandatory structural requirements for the outer introduction pipe 45, second guide pipe 46, and second injection nozzle 47, and the system may be constituted without these members if sufficient water impetus can be ensured solely by the first injection nozzle 44.

Moreover, it suffices that only the runner 40 turns in a manner not generating runout, and a structure where only one of the first connection pipe 43a and second connection pipe 46a is provided, or a structure where neither is provided, is also permitted.

Furthermore, instead of arranging the first guide pipes 43, first injection nozzles 44, second guide pipes 46, and second injection nozzles 47 in a manner not overlapping vertically in a plan view, the first guide pipes 43 and second guide pipes 46 may be arranged in a manner overlapping vertically in a plan view, for example, to adjust the balance of the center of gravity of the runner 40.

The cross-section shapes of the first guide pipe 43 and second guide pipe 46 are not limited to the foregoing.

As for the type of the second water storage tank 30, any size is permitted as long as the tank can store wastewater from the plant, etc., or rain water received by the roof of the plant, hospital or other building, if the hydroelectric power generation system 10 is small. If the hydroelectric power generation system 10 is large, on the other hand, a certain size is needed to store the water to be recycled, including wastewater from a wastewater treatment plant and water utilized for hydroelectric power generation. If the hydroelectric power generation system 10 is extremely large and uses a large-sized runner 40 of several tens of meters in diameter, a second water storage tank 30 must be used which has a size sufficient to draw water directly from a dam.

A structure where no second water storage tank 30 is provided, but a pipeline 31 is laid directly instead in the water flow channel at a position higher than the first water storage tank 20, is permitted so as to guide the high-pressure water into the first water storage tank 20 by utilizing the water level difference.

INDUSTRIAL FIELD OF APPLICATION

The present invention relates to a hydroelectric power generation system that can increase generation efficiency by keeping the rotational resistance of the runner low, while preventing water contamination at the same time, and has an industrial applicability

DESCRIPTION OF THE SYMBOLS

| | |
|---|---|
| W | Water |
| 10 | Hydroelectric power generation system |
| 20 | First water storage tank |
| 21 | Injection port |
| 22 | Discharge port |
| 23 | Reverse injection nozzle |
| 24 | Surface irregularity |
| 30 | Second water storage tank |
| 40 | Runner |
| 41 | Casing |
| 41b | Opening |
| 42 | Introduction pipe |
| 43 | First guide pipe |
| 43a | First connection pipe |
| 44 | First injection nozzle |
| 45 | Outer introduction pipe |
| 45b | Screw |
| 46 | Second guide pipe |
| 46a | Second connection pipe |
| 47 | Second injection nozzle |
| 50 | Transmission member |
| 60 | Generator unit |
| 61 | Principal axis of rotation |

What is claimed is:

1. A hydroelectric power generation system, having:
   a first water storage tank with a high-pressure water injection port on a bottom face;
   a runner which is stored in a condition of floating in the first water storage tank; and
   multiple transmission members that contact an outer periphery surface of the runner and transmit a rotational force of the runner to a principal axis of rotation in a generator unit;
   said hydroelectric power generation system characterized in that the runner has a casing of a cylindrical shape with a bottom and having an opening at a center of the bottom face; an introduction pipe that rises upward from the opening to introduce into the casing high-pressure water injected from the injection port; multiple first guide pipes that extend radially from around the introduction pipe to an inner side face of the casing; first injection nozzles provided at tips of the first guide pipes; and
   wherein a reactive force of the high-pressure water injected from the first injection nozzles in a circumferential direction of the casing is utilized to turn the runner.

2. A hydroelectric power generation system according to claim 1, characterized in that reverse injection nozzles are provided on an inner face of the first water storage tank which inject water in a direction opposite an injection direction of the high-pressure water from the first injection nozzles.

3. A hydroelectric power generation system according to claim 1, characterized in that the runner has:
   an outer introduction pipe whose diameter is larger than that of the introduction pipe and which rises upward from the opening wherein the introduction pipe is inserted inside the outer introduction pipe;
   multiple second guide pipes that extend from around the outer introduction pipe radially to the inner side face of the casing; and
   second injection nozzles provided at tips of the second guide pipes;
   wherein each first injection nozzle and each second injection nozzle are integrated near the inner side face of the casing.

4. A hydroelectric power generation system according to claim 3, characterized by having at least one of a first connection pipe that interconnects the multiple first guide pipes and a second connection pipe that interconnects the multiple second guide pipes.

5. A hydroelectric power generation system according to claim 3, characterized in that the first guide pipes, first injection nozzles, second guide pipes and second injection nozzles are arranged in such a way that they do not overlap vertically in a plan view.

6. A hydroelectric power generation system according to claim 3, characterized in that at least one of the first guide pipes and second guide pipes is made smaller in cross-section area toward a radial outward direction.

7. A hydroelectric power generation system according to claim 3, characterized in that a screw is provided below the outer introduction pipe and this screw rotates together with the runner to take water from the first water storage tank into the outer introduction pipe.

8. A hydroelectric power generation system according to claim 1, characterized in that at least one of the inner side face and bottom face of the first water storage tank has surface irregularities.

9. A hydroelectric power generation system according to claim 1, characterized by having a second water storage tank at a position where a level of water therein becomes higher than a level of water in the first water storage tank, so that a water level difference between the first water storage tank and second water storage tank is utilized to generate high-pressure water.

* * * * *